United States Patent Office 3,214,392
Patented Oct. 26, 1965

3,214,392
FOAMABLE RESINOUS POLYURETHANE
COMPOSITIONS
Michael Worsley, Niagara Falls, N.Y., assignor to Hooker Chemical Corporation, Niagara Falls, N.Y., a corporation of New York
No Drawing. Filed Aug. 21, 1961, Ser. No. 132,537
10 Claims. (Cl. 260—2.5)

This invention relates to improved resinous compositions and the method for preparing same. More particularly, the present invention resides in polyurethane compositions that are especially useful in the preparation of fire-retardant, rigid and flexible polyurethane foams. In a further aspect, the invention relates to novel polyurethane compositions and in particular to the foam products. The compositions of the invention are also useful in the preparation of adhesives, binders, laminates, coatings and potting compounds.

Polyurethane compositions and particularly the foamed products that are fire resistant are becoming increasingly important in industry. A method that has been successful in imparting fire resistance to polyurethane compositions was disclosed in copending application S.N. 821,722, filed June 22, 1959, now U.S. Patent 3,036,999. The method of the copending application is to provide a resinous reaction product or "prepolymer" composition comprising the reaction product of the dicarboxylic acid adduct of hexahalocyclopentadiene and maleic anhydride, and an organic polyisocyanate. Such a prepolymer composition is reacted with a hydroxyl-containing polymeric material to provide a highly fire-resistant polyurethane composition as disclosed in copending application S.N. 853,689, filed November 18, 1959, now U.S. Patent 3,055,850. These resinous compositions have proven to be quite successful commercially, but in the course of their commercial development one disadvantage has developed. In some instances it is desired to pre-mix and store the resinous composition with a foaming agent such as the fluorochlorocarbons, and at some later date to use the mixture to produce a finished polyurethane foam product. It has been found that prolonged storage of the mixture of the resinous composition and the forming agent such as a fluorochlorocarbon results in the precipitation of a sludge from the mixture. After very long periods of time and with compositions containing large amounts of the halogen-containing components, the stored mixture can even resemble a semi-solid, which cannot be restored to the fluid condition by heating or other means. Obviously such a mixture cannot be readily mixed with the hydroxyl-containing material to produce a polyurethane composition.

Accordingly, it is an object of the invention to provide a fire-resistant resinous composition which can readily be stored with a foaming agent and subsequently used in the preparation of polyurethane foams. It is a further object of the invention to provide a resinous composition which is also useful in the preparation of fire-retardant adhesives, coating compositions, and elastomers. Another object of the invention is to provide resinous compositions which are fluid at room temperature and thereby readily handled by conventional metering and pumping equipment. An additional object of the invention is to provide fire-resistant polyurethane foams which are non-flammable in the solid or molten state.

These and other objects are accomplished by providing the resinous reaction product of a mixture comprising (1) the polycarboxylic acid adduct of hexaholocyclopentadine and a polycarboxylic compound containing aliphatic carbon to carbon unsaturation, (2) the adduct of hexahalocyclopentadiene and a polyhydric alcohol containing aliphatic carbon to carbon unsaturation, and (3) an organic polyisocyanate; where in the halogen is selected from the group consisting of fluorine, chlorine, bromine and mixtures thereof. It is also within the scope of the invention to incorporate in the composition an epoxide. Such resinous reaction products are useful in the preparation of polyurethane compositions by reacting them with hydroxyl-containing polymeric materials having a hydroxyl number between thirty and nine hundred and fifty and selected from the group consisting of (a) a polyester comprising the reaction product of a polyhydric alcohol and a polycarboxylic compound, (b) a polyether comprising the reaction product of monoepoxide and a compound selected from the group consisting of a polyhydric alcohol, a polyphenolic compound and a polycarboxylic acid, and (c) mixtures thereof. When polyurethane foamed products are desired, a foaming agent is mixed with the resinous reaction product and the hydroxyl containing polymeric material. In one aspect of the invention, the foaming agent is pre-mixed with the resinous composition to provide a stable mixture which can be stored for many months prior to being reacted with a hydroxyl-containing polymeric material to produce a polyurethane composition.

It has been found that the incorporation of the alcohol adduct of hexahalocyclopentadiene into the composition greatly improves the stability problem described hereinbefore while maintaining the excellent fire resistance of the compositions. Further improvements in stability are achieved by incorporating the epoxide as an additional component of the composition.

Among the carboxylic acid adduct of hexahalocyclopentadiene and polycarboxylic compounds which can be used in the preparation of the resinous compositions of this invention are: 1,4,5,6,7,7-hexachlorobicyclo-(2.2.1)-5 - heptene - 2,3 - dicarboxylic acid; 1,4,5,6,7,7 - hexachloro - 2 - methylbicyclo - (2.2.1) - 5 - heptene - 2,3-dicarboxylic acid; 1,4,5,6-tetrachloro-7,7-difluorobicyclo-(2.2.1)-5-heptene-2,3-dicarboxylic acid; and 1,4,5,6,7,7-hexachlorobicyclo - (2.2.1) - 5 - heptene - 2 - acetic - 2-carboxylic acid.

Among the adducts of hexahalocyclopendtadiene and polyhydric alcohols which can be used in the preparation of the resinous composition of this invention are: 2,3-dimethylol - 1,4,5,6,7,7 - hexachlorobicyclo - (2.2.1) - 5-heptene; 1,4,5,6,7,7 - hexachloro - 2,3 - bis - hydroxymethylbicyclo - (2.2.1) - 2,5 - heptadiene; 3 - (1,4,5,6,7,7-hexachlorobicyclo - (2.21) - 5 - heptene - 2 - yl) - methoxy- 1,2 - propanediol; 2,3 - dimethylol - 1,4,5,6 - tetrachloro- 7,7 - difluorobicyclo - (2.2.1) - 5 - heptene; 2,3 - dimethylol - 1,4,5,6,7,7 - hexabromobicyclo - (2.2.1) - 5 - heptene; 3 - (1,4,5,6 - tetrachloro - 7,7 - difluorobicyclo- (2.2.1) - 5 - heptene - 2 - yl) - methoxy - 1,2 - propane diol. These compounds and the method of preparation are disclosed in copending application S.N. 308,922 for "Polyhalogen-Containing Polyhydric Compounds," filed September 10, 1952, now U.S. Patent 3,007,958.

A large number of various organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used, among them phenyl diisocyanate; alpha-naphthyl diisocyanate; 4-tolylene diisocyanate; n-hexyl diisocyanate; methylene-bis-(4-phenyl isocyanate); 3,3'-bitolylene-4,4'-diisocyanate; 3,3'-dimethoxy-4,4' - biphenylene diisocyanate; 1,5-naphthalene diisocyanate; 2,4-chlorophenyl diisocyanate; hexamethylene diisocyanate; ethylene diisocyanate; trimethylene diisocyanate; tetramethylene diisocyanate; pentamethylene diisocyanate; decamethylene diisocyanate; 1,3-cyclopentylene diisocyanate; 1,2-cyclohexylene diisocyanate; 1,4-cyclohexylene diisocyanate; cyclopentylidene diisocyanate; cyclohexylidene diisocyanate; p-phenylene diisocyanate; m-phenylene diisocyanate; 4.4'-diphenyl propane diisocyanate; 4.4'-diphenyl methane diisocyanate; 1-methyl-2,4-phenylene diisocyanate; 4,4'-diphenylene diisocyanate; 1,2-propylene diisocyanate; 1,2-butylene diisocyanate; 2,3-butylene diisocyanate; 1,3-butylene diisocyanate; ethylidene diisocyanate; propylidene diisocyanate; butylidene diisocyanate; 1,3,5-benzene triisocyanate; 2,4,6-tolylene triisocyanate; 2,4,6-monochlorobenzene triisocyanate; 4,4',4''-triphenylmethane triisocyanate; polymethylene polyphenylisocyanate and mixtures thereof. Higher isocyanates are provided by the liquid reaction products of (1) diisocyanates and (2) polyols or polyamines; etc. In addition, isothiocyanates and mixtures of isocyanates may be employed. Also contemplated are the many impure or crude polyisocyanates that are commercially available.

Monomeric and polymeric epoxides can be used in the practice of the invention. Examples of mono-epoxides that may be employed in the practice of the invention are ethylene oxide, propylene oxide, butylene oxide, isobutylene oxide, cyclohexane oxide, 2,3-epoxyhexane, 3-ethyl-2,3-epoxyoctane, epichlorohydrin, epibromohydrin, styrene oxide, decylene oxide, triphenyl glycidyl silane, allyl glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl ethylene oxide,

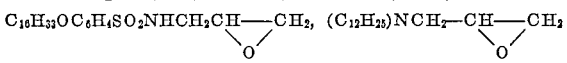

and the like. The prefered monoepoxides are the monoepoxide substituted hydrocarbons, the monoepoxy-substituted ethers, sulfides, sulfones and esters wherein the said compounds contain no more than eighteen carbon atoms. Typical diepoxides are: 3,4-epoxy-6-methylcyclohexylmethyl-3,4-epoxy-6 - methylcyclohexanecarboxylate, dicyclopentadiene dioxide, limonene dioxide, 4,4'(diglycidyl) diphenylpropane, vinylcyclohexane dioxide. Examples of suitable polyepoxides are: epoxidized vegetable oils, and novolak polyglycidyl ethers.

In the preparation of the resinous compositions of the instant invention, the preferred order of mixing the components is polyisocyanate, epoxide, acid adduct and alcohol adduct. Using this order, maximum advantage can be taken of the heat of reaction, i.e., the lower boiling epoxide can be added while the reactor is cool; the higher melting alcohol adduct can be added when the reaction vessel has reached a higher temperature. Thus no reheating need be employed. However the only requirment in the order of mixing is that the acid adduct not be permitted to preferentially react with the polyisocyanate when an epoxide is to be employed. This condition is fulfilled by reacting the acid adduct and epoxide in the presence of the polyisocyanate. The hexahalocyclopentadiene adducts are adde to the polyisocyanate at a temperature preferably from about thirty to one hundred and twenty degrees centigrade. When a comparatively low boiling epoxide is employed, it is preferred to maintain the reaction temperature below about sixty degrees centigrade at least until the reaction with the epoxide is substantially complete to prevent loss by evaporation. After the polyisocyanate and the hexahalocyclopentadiene adducts are mixed, the reaction product is preferably heated at a temperature from about one hundred and ten to one hundred and thirty degrees centigrade for a period from about thirty minutes to one hundred and thirty minutes. The ennumerated temperature ranges are preferred, but it is understood that higher or lower temperatures can be used if desired.

The polyisocyanate and the adducts of hexahalocyclopentadiene are employed in a ratio so that the reaction product contains at least some free isocyanate groups. When the composition is used to produce foam products; it is preferred that the ratio be sufficient to provide at least three hundred percent of isocyanate groups for the total number of carboxyl and hydroxyl groups in the resinous composition. The upper limit on the ratio of isocyanate groups to hydroxyl and carboxyl groups is governed by the results desired, but would not generally exceed about fifteen hundred percent. With respect to the ratio of the acid adduct of hexahalocyclopentadiene to the alcohol adduct of hexahalocyclopentadiene in the resinous compositions of the invention, it is contemplated to use any ratio falling between one hundred percent of either pure material, since some improvement results from the incorporation of a small amount of the alcohol adduct. However, the lower practical limit of the mole ratio of acid adduct to alcohol adduct is about ten to one, and preferably about seven to one. The upper limit of the mole ratio of acid adduct to alcohol adduct is generally dictated by economic considerations snice at the present time the alcohol adduct is more expensive. The upper mole ratio could extend as high as one to ten, but preferably would not exceed a ratio of one to one. When an epoxide is employed in the composition, it is preferably employed in the amount sufficient to provide one oxirane oxygen per one carboxyl group of the acid adduct. However the epoxide can be employed in a ratio to provide from zero to 1.2 oxirane oxygen groups for each carboxyl group of the acid adduct.

The hydroxyl containing polymeric materials that can be used with the resinous compositions of the instant invention are polyesters, polyethers, and mixtures thereof. The polyesters employed are known in the art and are the reaction products of a polyhydric alcohol and a polycarboxylic compound. Whenever used in this application, the term polycarboxylic compound is intended to include the acids, the acid anhydrides, the acid halides or the acid esters or mixtures thereof.

It is generally desirable, especially in rigid or semi-rigid foams, that at least a portion of the total polyhydric alcohol component contains three hydroxyl groups in order to provide a means for branching the alkyd; however, the ratio of dihydric alcohol to trihydric alcohol may be varied depending on the amount of branching desired. The polyhydric alcohols may be aliphatic, cycloaliphatic, heterocyclic or aromatic and may be saturated or unsaturated. The alcohol may contain one or more dissimilar atoms between carbon atoms in their molecule, such as oxygen, sulfur and the like. They may also be substituted with non-interfering substituents, such as halogen atoms, ester radicals, and the like. Illustrative polyhydric alcohols include the following: glycerol; polyglycerol; pentaerythritol; polypentaerythritol; mannitol, trimethylolpropane; sorbitol; methyltrimethylolmethane; 1,4,6-octanetriol; butanediol; pentanediol; hexanediol; dodecanediol; octanediol; chloropentanediol; glycerol monoallyl ether; glycerol monoethyl ether; triethylene glycol; 2-ethylhexanediol-1,4; 3,3'-thiodipropanol; 4,4'-sulfonyldihexanol; cyclohexanediol-1,4; 1,2,6-hexanetriol; 1,3,5-hexanetriol; polyallyl alcohol; 1,3-bis(2-hydroxyethoxy) propane; 5,5'-dihydroxydiamyl ether; tetrahydrofuran-2,5-dipropanol; tetrahydrofuran-2,5-dipentanol; 2,5-dihydroxytetrahydrofuran; tetrahydrothiophene - 2,5 - dipropanol; tetrahydropyrrol-2,5-propanol; 4-hydroxy-3-hydroxytetrahydropyran; 2,5 - dihydroxy-3,4-dihydro-1,2-pyran; 4,4'-sulfinyldipropanol; 2,2-bis(4-hydroxyphenyl)-propane; 2,2'-bis(4-hydroxyphenyl)-methane; and the like. Preferred polyols are the open-chain aliphatic polyhydric alcohols and polyalkylene ether polyols possessing from two to six esterifiable hydroxyl groups and containing no more than twenty carbon atoms.

The polycarboxylic compounds useful in the practice of the invention may be aliphatic, cycloaliphatic, aromatic or heterocyclic and may be saturated or unsaturated. Illustrative polycarboxylic compounds include the following: phthalic acid, isophthalic acid, terephthalic acid; tetrachlorophthalic acid; maleic acid; dodecylmaleic acid; octadecenylmaleic acid; fumaric acid; aconitic acid; itaconic acid; trimellitic acid; tricarballylic aid; 3,3'-thiodipropionic acid; 4,4'-sulfonyldihexanoic acid; 3-octenedioic-1,7 acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 3-chloro-3,5-cyclohexadiene - 1,2 - dicarboxylic acid; 8,12-eicosadienedioic acid; 8-vinyl-10-octadecenedioic acid; and the corresponding acid anhydrides, acid chlorides and acid esters, such as phthalic anhydride, phthaloyl chloride, and and the dimethyl ether of phthalic acid. Preferred polycarboxylic compounds are the aliphatic and cycloaliphatic dicarboxylic acids containing no more than fourteen carbon atoms and the aromatic dicarboxylic acids containing no more than fourteen carbon atoms.

Part or all of either the polyhydric alcohol or the polycarboxylic portion of the hydroxyl containing polymeric material can consist of an adduct of hexahalocyclopentadiene, wherein the halogen is selected from the group consisting of fluorine, chlorine, bromine and mixtures thereof. Among the adducts of hexahalocyclopentadiene and polycarboxylic compounds which can be used are any of the acid adducts disclosed hereinbefore as well as the corresponding acid anhydrides, acid chlorides and acid esters, such as for example, 1,4,5,6,7,7-hexachlorobicyclo-(2.2.1)-5-heptene-2,3-dicarboxylic anhydride; the mono- or dimethyl ester of 1,4,5,6,7,7-hexachlorobicyclo-(2.2.1)-5-heptene-2,3-dicarboxylic acid; 1,4,5,6-tetrachloro-7,7-difluorobicyclo-(2.2.1)-5-heptene - 2,3-dicarboxylic anhydride; and 1,4,5,6,7,7 - hexabromobicyclo-(2.2.1)-5-heptene-2,3-dicarbonyl chloride which is the adduct of hexabromocyclopentadiene with fumaryl chloride. The polyhydric alcohol adducts that can be used are any of those alcohol adducts disclosed hereinbefore.

The polyethers are the reaction products of a polyhydric alcohol, a polyphenolic compound or a polycarboxylic acid and a monomeric epoxide possessing a single epoxy group, such as, for example, propylene oxide. The polyhydric alcohols, polycarboxylic acids and epoxides which can be employed are any of the polyhydric alcohols, polycarboxylic acids and monoepoxides hereinbefore listed. The preferred monoepoxides are the monoepoxide substituted hydrocarbons, the monoepoxy-substituted ethers, sulfides, sulfones and esters wherein the said compounds contain no more than eighteen carbon atoms. Polyphenolic compounds which can be employed are the reaction products of phenolic compounds with aldehydes, such as phenolformaldehyde resins.

Where aromatic or bicyclo carboxylic compounds are used, it is often desirable to incorporate aliphatic acids as part of the resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic, etc., may also be used.

Reaction catalysts can be used in producing the polyurethane compositions. The catalyst employed may be any of the known conventional catalysts for isocyanate reactions, such as tertiary amines, for example, triethylamine, N-methyl morpholine, triethanolamine, etc., or antimony compounds such as disclosed and claimed in S.N. 803,820, for example, antimony caprylate, antimony naphthenate, or antimonous chloride. In addition, tin compounds may be employed such as disclosed and claimed in abandoned application S.N. 803,819, for example, dibutyltin dilaurate, tri-n-octyltin oxide, hexabutylditin, tributyltin phosphate, or stannic chloride. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

When the polyurethane compositions of the invention are foamed, any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, and difluorodichlorethane.

Anther foaming system that is suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1 - phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents may be employed.

The following resin formulations are typical hydroxyl-containing polymeric materials that may be used in the practice of this invention.

RESIN A 6 moles 1,4,5,6,7,7-hexachlorobicyclo-(2.2.1)-5-heptene-2,3-dicarboxylic acid
12 moles trimethylolpropane
Acid number: less than 10
Hydroxyl number: 365.

RESIN B 6 moles adipic acid
10 moles trimethylolpropane
Acid number: less than 1
Hydroxyl number: 504.

RESIN C 5 moles phenol
4 moles formaldehyde
1.25 moles ethylene oxide per phenolic hydroxide group
Hydroxy number: 325

RESIN D 3 moles phenol
2 moles formaldehyde
2.5 moles ethylene oxide per phenolic hydroxide group
Hydroxyl number: 270.

RESIN E

Polypropylene glycol
Molecular weight: about 2000
Hydroxyl number: 56.

RESIN F 4 moles 1,4,5,6,7,7-hexachlorobicyclo-(2.2.1)-5-heptene-2,3-dicarboxylic acid
7.6 moles glycerol
2 moles adipic acid
Acid number: 5
Hydroxyl number: 265.

RESIN G 3 moles adipic acid
5 moles glycerol
Acid number: 1
Hydroxyl number: 640.

RESIN H 1 mole trimethylolpropane
6 moles propylene oxide
Hydroxyl number: 392.

RESIN I 8.8 moles trimethylolpropane
5 moles adipic acid
1 mole phthalic anhydride
Acid number: less than 1
Hydroxyl number: 435.

RESIN J 1 mole 1,4,5,6,7,7-hexachlorobicyclo-(2.2.1)-5-heptene-2,3-dicarboxylic acid
4 moles propylene oxide
Acid number: 0
Hydroxyl number: 202.

In preparing the polyurethane compositions of this invention, the components are preferably reacted in a ratio sufficient to provide about eighty-five to one hundred and fifteen percent of isocyanate groups with respect to the total number of hydroxyl and carboxyl groups present in the hydroxyl-containing polymeric material (and the foaming agent, if one is provided). The reaction temperature generally ranges from about twenty to about one hundred and twenty degrees centigrade, although higher and lower temperatures can be used.

The invention is illustrated by the following specific examples, but is not intended to be limited thereby.

*Example 1*

593 parts of 1,4,5,6,7,7-hexachlorobicyclo-(2.2.1) - 5-heptene-2,3-dicarboxylic acid is added to 1392 parts of toluene diisocyanate at a temperature of eighty degrees centigrade. After completing the mixing step, the temperature is raised to one hundred and ten degrees centigrade for one-half hour. The product is cooled and found to be a liquid resinous product. To one hundred parts of the resulting product is added twenty-five parts of trichlorofluoromethane foaming agent. The mixture is stored at zero degrees centigrade to simulate transit conditions in the wintertime. After a period of several weeks, the mixture is a semi-solid that cannot be restored to the fluid condition by heating or other means.

*Example 2*

To 1392 parts of toluene diisocyanate is added 297 parts of 1,4,5,6,7,7-hexachlorobicyclo-(2.2.1)-5-heptene-2,3-dicarboxylic acid at a temperature of about forty degrees centigrade. The temperature is raised to eighty degrees centigrade and 297 parts of 2,3-dimethylol-1,4,5,6,7,7-hexachlorobicyclo-(2.2.1)-5-heptene is added to the mixture and then the temperature is raised to one hundred and twenty degrees centigrade for the hour. One hundred parts of the resulting liquid resinous reaction products is mixed with thirty parts of trichlorofluoromethane foaming agent and stored at zero degrees centigrade. At the end of 1.5 months only a slight amount of sludge has precipitated and the composition is readily usable in the preparation of a polyurethane foam as shown in the following example.

*Example 3*

One hundred and thirty grams of the composition of Example 2 that has been stored for a period of one and one-half months at zero degrees centigrade is added to one hundred parts of a commercial polyol prepared from thirty-five parts by weight of a polyether which is the reaction product of trimethylol propane and propylene oxide, and sixty-five parts by weight of the polyester prepared from twelve moles of trimethylol propane, six moles of 1,4,5,6,7,7 - hexachlorobicyclo - (2.2.1)-5-heptene-2,3-dicarboxylic acid reacted to an acid number of less than ten. One-half gram of dibutyltin dilaurate is added as a catalyst and the mixture is rapidly stirred for fifteen seconds. The product is a rigid fire-resistant foam having a density of about two pounds per cubic foot.

*Example 4*

The procedure of Example 2 is repeated except that there are reacted together 430 parts of 1,4,5,6,7,7-hexachlorobicyclo-(2.2.1)-5-heptene-2,3-dicarboxylic acid, 165 parts of 2,3 - dimethylol-1,4,5,6,7,7-hexachlorobicyclo-(2.2.1)-5-heptene and 1392 parts of toluene diisocyanate. The resulting resinous composition is stored at zero degrees centigrade. After a period of one and one-half months, only a slight amount of sludge has precipitated such that the composition is readily used in the preparation of a flexible polyurethane foam in accordance with Example 5.

*Example 5*

To seventy grams of the mixture that has been stored for one and one-half months at zero degrees centigrade in accordance with Example 4 is added a solution of the following components: 100 parts of polypropylene glycol having a molecular weight of about 2000, three parts of a twenty-eight percent solution of concentrated aqueous ammonium hydroxide, 0.7 part of dimethylsilicone and 0.5 part of dibutyltin dilaurate. The mixture is stirred for fifteen seconds and poured into a mold. The foam is cured for about thirty minutes at one hundred and twenty degrees centigrade. The resulting flexible foam has a density of about two pounds per cubic foot and is self-extinguishing upon ignition.

*Example 6*

The procedure of Example 4 is repeated except that the components are 1,4,5,6,7,7-hexabromobicyclo-(2.2.1)-5-heptene-2,3-dicarboxylic acid; 3-(1,4,5,6,7,7-hexachlorobicyclo-(2.2.1)-5-heptene-2-yl) - methoxy - 1,2 - propane diol; and a mixture of fifty percent methylene-bis-(4-phenyl isocyanate) and fifty percent tolylene diisocyanate. The resulting resinous composition is mixed with trichlorofluoromethane and successfully stored at zero degrees centigrade for an extended period.

| Example Number | Hydroxyl Containing Polymeric Material | Resinous Composition and Foaming Agent |
| --- | --- | --- |
| 7 | Resin B | Example 2. |
| 8 | Resin C | Example 2. |
| 9 | Resin F | Example 4. |
| 10 | Resin H | Example 4. |
| 11 | Resin J | Example 6. |

The following examples show the use of the mixtures of the resinous compositions of the instant invention and a foaming agent such as trichlorofluoromethane in the preparation of polyurethane foam products. The hydroxyl-containing polymeric materials used in these examples are those disclosed in columns 6 and 7.

The following examples illustrate the preparation of compositions of the invention that contain an epoxide as an additional component.

*Example 12*

To 1392 parts of toluene diisocyanate is added eighty-eight parts of propylene oxide at a temperature of about forthy degrees centigrade. To this mixture is added 430 parts of 1,4,5,6,7,7-hexachlorobicyclo-(2.2.1)-5-heptene-2,3-dicarboxylic acid. The temperature of the reaction mixture is then increased to eighty degrees centigrade and 165 parts of 2,3-dimethylol-1,4,5,6,7,7-hexachlorobicyclo-(2.2.1)-5-heptene is added to the mixture. Subsequently, the reaction temperature is raised to one hundred and twenty degrees centigrade for one hour. One hundred parts of the resulting resinous product is mixed with thirty parts trichlorofluoromethane foaming agent and stored at zero degrees centigrade. At the end of 1.5 months almost no sludge has precipitated and the composition is readily usable in the preparation of a polyurethane froam as shown in Example 13.

*Example 13*

About 130 grams of the composition of Example 12 that has been stored for a period of one and one-half months at zero degrees centigrade is added to one hundred parts of a commercial polyol prepared from thirty-five parts by weight of a polyether which is the reaction product of trimethylol propane and propylene oxide, and sixty-five parts by weight of a polyester prepared from twelve moles of trimethylol propane, six moles of 1,4,5,6,7,7-hexachlorobicyclo-(2.2.1)-5-heptene - 2,3 - dicarboxylic acid reacted to an acid number of less than ten. One-half gram of dibutyltin dilaurate is added as a catalyst and the mixture is rapidly stirred for fifteen seconds. The produce is a rigid fire-resistance foam having a density of about two pounds per cubic foot.

Using the method of Example 12, additional resinous compositions are prepared wherein the epoxide is indicated as follows:

Example number:                                Epoxide
   14 ____ Ethylene oxide.
   15 ____ 3,4 - epoxy-6-methylcyclohexylmethyl-3,4-epoxy-6-methylcyclohexane carboxylate.

The resins remain fluid after storage for several months at zero degrees centigrade in the presence of trichlorofluoromethane, and are used in the preparation of polyurethane foams in accordance with the method of Example 13.

While my invention has been described with reference to certain specific embodiments, it will be recognized by those skilled in the art that many variations are possible without departing from the spirit and scope of the invention.

I claim:
1. The resinous reaction product of the mixture comprising (1) the carboxylic acid adduct of hexahalo-cyclopentadiene and a polycarboxylic compound containing aliphatic carbon-to-carbon unsaturation, (2) the adduct of hexahalocyclopentadiene and a polyhydric alcohol containing aliphatic carbon-to-carbon unsaturation and (3) an organic polyisocyanate; wherein the halogen is selected from the group consisting of fluorine, chlorine, bromine and mixtures thereof.

2. The resinous reaction product of the mixture comprising (1) the carboxylic acid adduct of hexahalo-cyclopentadiene and a polycarboxylic compound containing aliphatic carbon-to-carbon unsaturation, (2), the adduct of heexahalocyclopentadiene and a polyhydric alcohol containing aliphatic carbon-to-carbon unsaturation, (3) a 1,2-epoxide, and (4) an organic polyisocyanate; wherein the halogen is selected from the group consisting of fluorine, chlorine, bromine and mixtures thereof.

3. The product of claim 1 wherein the carboxylic acid adduct is 1,4,5,6,7,7-hexachlorobicyclo-(2.2.1)-5-heptene-2,3-dicarboxylic acid.

4. The product of claim 1 wherein the alcohol adduct is 2,3-dimethylol-1,4,5,6,7,7,-hexachlorobicyclo-(2.2.1)-5-heptane.

5. A storage stable mixture comprising a low boiling fluorochlorocarbon and a resinous reaction product of components comprising (1) the carboxylic acid adduct of hexahalocyclopentadiene and a polycarboxylic compound containing aliphatic carbon-to-carbon unsaturation, (2) the adduct of hexahalocyclopentadiene and a polyhydric alcohol containing aliphatic carbon-to-carbon unsaturation and (3) an organic polyisocyanate; wherein the halogen is selected from the group consisting of fluorine, chlorine, bromine and mixtures thereof.

6. The storage stable mixture of claim 5 wherein the low boiling fluorochlorocarbon is trichlorofluoromethane.

7. A storage stable mixture comprising a low boiling fluorochlorocarbon and a resinous reaction product of components comprising (1) the carboxylic acid adduct of hexahalocyclopentadiene and a polycarboxylic compound containing aliphatic carbon-to-carbon unsaturation, (2) the adduct of hexahalocyclopentadiene and a polyhydric alcohol containing aliphatic carbon-to-carbon unsaturation, (3) a 1,2-epoxide, and (4) an organic polyisocyanate; wherein the halogen is selected from the group consisting of fluorine, chlorine, bromine and mixtures thereof.

8. The storage stable mixture of claim 7 wherein the low boiling fluorochlorocarbon is trichlorofluoromethane.

9. The storage stable mixture comprising a low boiling fluorochlorocarbon and a resinous reaction product of components comprising (1) 1,4,5,6,7,7-hexachlorobicyclo-(2.2.1)-5-heptene-2,3-dicarboxylic acid, (2) 2,3-dimethylol-1,4,5,6,7,7-hexachlorobicyclo - (2.2.1) - 5 - heptene and (3) an organic polyisocyanate.

10. The storage stable mixture of claim 9 wherein the low boiling fluorochlorocarbon is trichlorofluoromethane.

References Cited by the Examiner

UNITED STATES PATENTS

| | | | |
|---|---|---|---|
| 2,890,144 | 6/59 | Robitschek et al. | 260—869 |
| 2,894,919 | 7/59 | Simon et al. | 260—2.5 |
| 3,036,021 | 5/62 | Trescher et al. | 260—2.5 |
| 3,036,999 | 5/62 | Worsley et al. | 260—2.5 |
| 3,055,849 | 9/62 | Hindersinn et al. | 260—2.5 |
| 3,055,850 | 9/62 | Worsley et al. | 260—2.5 |
| 3,058,925 | 10/62 | Robitschek | 260—2.5 |

FOREIGN PATENTS 876,469    9/61    Great Britain.

MURRAY TILLMAN, *Primary Examiner.*

WILLIAM H. SHORT, *Examiner.*